(12) United States Patent
Kaku

(10) Patent No.: US 6,354,942 B1
(45) Date of Patent: Mar. 12, 2002

(54) METHOD FOR EXECUTING GAME AND GAME DEVICE FOR IMPLEMENTING SAME

(75) Inventor: Tetsuya Kaku, Tokyo (JP)

(73) Assignee: Sega Enterprises, Ltd., Tokyo (JP)

( * ) Notice: Subject to any disclaimer, the term of this patent is extended or adjusted under 35 U.S.C. 154(b) by 0 days.

(21) Appl. No.: 09/485,926
(22) PCT Filed: Jun. 21, 1999
(86) PCT No.: PCT/JP99/03304
§ 371 Date: Feb. 18, 2000
§ 102(e) Date: Feb. 18, 2000
(87) PCT Pub. No.: WO00/01454
PCT Pub. Date: Jan. 13, 2000

(30) Foreign Application Priority Data

Jul. 2, 1998 (JP) .......................................... 10-187667

(51) Int. Cl.[7] ................................................ A63F 13/10
(52) U.S. Cl. ................................ 463/24; 463/8; 463/31
(58) Field of Search ............................ 463/24, 29, 30, 463/31, 32, 33, 7, 8

(56) References Cited

U.S. PATENT DOCUMENTS 4,738,451 A * 4/1988 Logg .......................... 463/31

FOREIGN PATENT DOCUMENTS

JP 8-131653 5/1996
JP 9-173635 7/1997

* cited by examiner

*Primary Examiner*—Jessica J. Harrison
(74) *Attorney, Agent, or Firm*—Dickstein Shapiro Morin & Oshinsky LLP

(57) ABSTRACT

A game device is provided, whereby, when a character operated by a player is displayed making an intrusion or entry in a fighting or participatory type of game, the character making the intrusion or entry can be displayed in a manner which avoids creating an unnatural effect. The game device includes control means wherein the control means acquires the co-ordinate position of a character displayed on the display screen receiving an intrusion by another character, when an intrusion request for a character is detected; and causes the character being controlled by the player to be displayed as making an appearance as an intruding character from a specific location corresponding to a co-ordinate position having a particular relationship with respect to the co-ordinate position of the character receiving the intrusion, from amongst the stored and held plurality of specific locations.

9 Claims, 4 Drawing Sheets

| Appearance position 1 | Co-ordinate position 1 |
| --- | --- |
| Appearance position 2 | Co-ordinate position 2 |
| Appearance position 3 | Co-ordinate position 3 |
| Appearance position 4 | Co-ordinate position 4 |
| Appearance position 5 | Co-ordinate position 5 |
| Appearance position 6 | Co-ordinate position 6 |

METHOD FOR EXECUTING GAME AND GAME DEVICE FOR IMPLEMENTING SAME

BACKGROUND OF THE INVENTION

1. Field of the Invention

The present invention relates to a game device displaying a plurality of characters, whose respective movements are mutually associated, simultaneously, on a single screen. In particular, it relates to game devices wherein, when a character operated by a player in a fighting game makes a sudden intrusion, this character is displayed appearing from a particular position having a prescribed relationship with respect to the character being intruded upon, or alternatively, game devices where, in a participatory type of game, a character is displayed joining the game on the screen, whilst the game is in progress.

2. Description of the Related Art

Fighting games for enacting combat between characters displayed on a monitor screen by controlling the movements of the respective characters are played widely on game devices.

Fighting games of this kind provide a first game mode, wherein one player controls a first character displayed on the monitor screen and fights against a second character controlled by control means in the game device, and a second game mode, wherein a fighting game is played by two different players respectively controlling the first and second characters displayed on the monitor screen.

When implementing the second game mode, apart from cases where two different players play a combat game from the beginning, there are also cases where, initially, a single player is controlling a first character displayed on the monitor screen and playing a combat game against a second character controlled by the control means, according to the first game mode, during the course of which, a further player joins in the game and controls the second character, in place of the control means, thereby executing a fighting game according to the second mode.

Executing a fighting game according to this second mode also involves the second player making a sudden intrusion into the fight when he or she joins the game. In this case, the player joining the fighting game during the course of the game is called the intruder and the player on the receiving end of this new participation in the fighting game is called the intruded party.

FIG. 6 is shows a mode of sudden intrusion in a fighting game of this kind. In FIG. 6, it may be supposed that the characters a, b, c depicted are characters engaged in a fight with characters controlled by control means in the game device, according to the first game mode described above, or that they are characters already being operated by another player, according to the second game mode.

In either of these cases, a situation arises where a player makes a sudden intrusion, in other words, he or she joins in the fighting game. In this case, the player joins the fighting game by inputting a sudden intrusion request display signal, by using input means attached to the game device main unit (not illustrated). Upon detecting this signal, the game device causes a character A controlled by the player wishing to make a sudden intrusion, on the monitor screen.

In this case, as illustrated in FIG. 6, the display method adopted hitherto involves a dramatic display wherein the character A drops down from the sky on the monitor screen. This type of display method creates a display which is unnatural in the context of the game.

At the same time, this method may also create a situation where one of the players involved in the game finds it easier to control his or her character than the other player, in other words, it creates conditions which are respectively advantageous and disadvantageous to the two players engaged in the fighting game. Consequently, the end of the fighting game may come inappropriately quickly, and hence the players may lose interest in the fighting game itself.

SUMMARY OF THE INVENTION

Therefore, it is an object of the present invention to provide a game device, whereby, when displaying an image of a character operated by a player making a sudden intrusion in a fighting game, this intruder character can be displayed in a manner which avoids creating an unnatural effect.

In order to achieve the aforementioned object, one aspect of the present invention is a method for controlling the movements on a display screen of at least one character of a plurality of characters displayed on a display device, according to operations implemented by a player, and executing a game in association with the movements of other characters, comprising the steps of: executing and controlling a game program; developing a game according to the execution of the game program and storing and holding the co-ordinates of a plurality of specific locations in the scene displayed on the display screen; acquiring the co-ordinate position of a character displayed on the display screen receiving an entrance by another character, when an entrance request for a character is detected; and displaying the character being controlled by the player as making an appearance as a entering character from a specific location corresponding to a co-ordinate position having a particular relationship with respect to the co-ordinate position of the character receiving an entrance, from amongst the stored and held plurality of specific locations.

A further aspect of the invention is a method for executing a game as described above, wherein the co-ordinate position of the specific location corresponding to a co-ordinate position having a particular relationship with respect to the co-ordinate position of the character receiving an entrance is a co-ordinate position which is in the vicinity of the co-ordinate position of the character receiving the entrance and separated by a prescribed distance or more from the character receiving the entrance.

A further aspect of the invention is a method for executing a game as described above, wherein the entering character is a character which engages in combat with the character receiving the entrance, the display of which is controlled in accordance with the operations implemented by the player.

Other aspects of the present invention shall become evident from the embodiment of the present invention as described with reference to the accompanying drawings.

DESCRIPTION OF THE PREFERRED EMBODIMENTS

Figure 1:
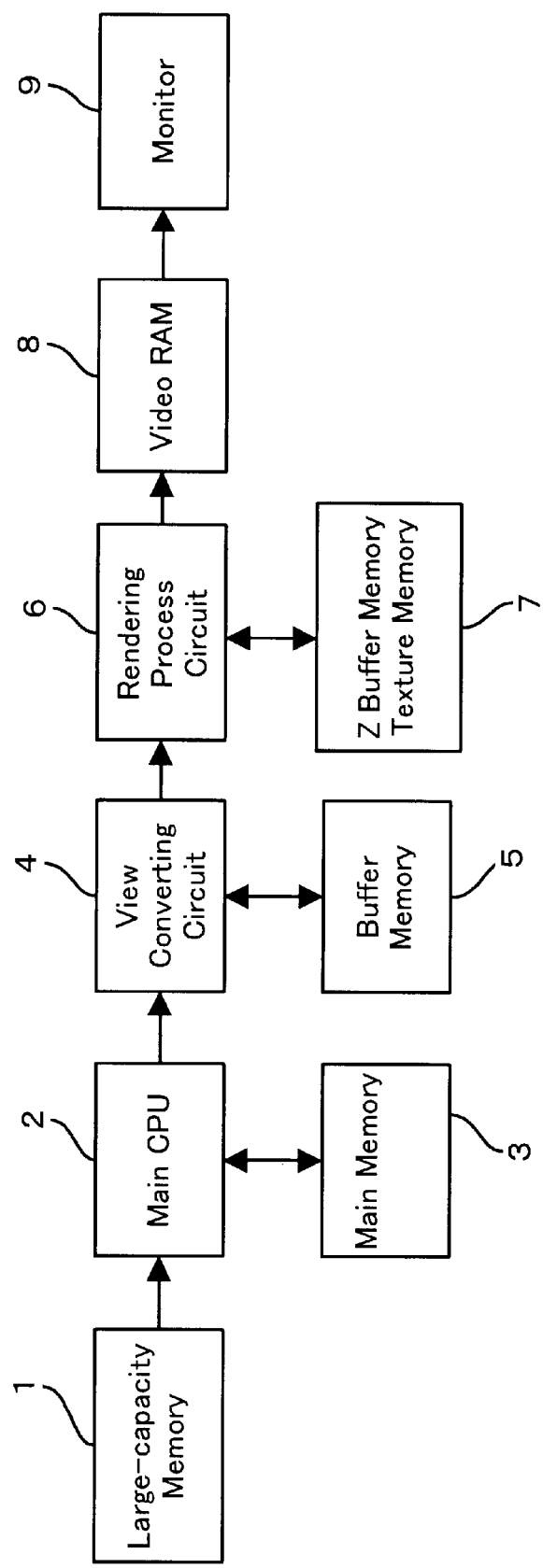
FIG. 1 is a block diagram of an embodiment of a game device according to the present invention.

Below, an embodiment of the present invention is described with reference to the drawings. In the drawings, the same reference numerals or reference symbols have been attached to items which are the same or similar.

FIG. 1 is a block diagram of an embodiment of a game device whereby, in a fighting game according to the present invention, when a character operated by a player is displayed making a sudden intrusion, the character in question is displayed making an appearance from a particular position having a prescribed relationship with respect to the co-ordinate position of the character which is intruded upon.

In FIG. 1, a large-capacity memory 1, such as a CD-ROM, or the like, stores fighting game programs and a plurality of polygon data constituting the characters to be displayed in the fighting game.

When the game device is started up, a main CPU 2, which forms control means, reads out a fighting game program from the large-capacity memory 1, and controls the execution of that program. Moreover, the main CPU 2 also reads out the necessary polygon data from the large-capacity memory 1 and transfers this data to a view converting circuit 4.

A main memory 3 stores the fighting game program and polygon data read out from the large-capacity memory 1. Accordingly, during control operations, the main CPU 2 accesses the main memory 3 and implements processing.

The view converting circuit 4 converts the polygon data comprising three-dimensional local co-ordinate data transferred from the main CPU to a global co-ordinate system, and it further converts these co-ordinates to a viewpoint co-ordinate system having an origin at a viewpoint. These co-ordinates are then converted to two-dimensional co-ordinates data by projecting the polygons onto a flat two-dimensional plane in the viewpoint co-ordinates system. A buffer memory 5 buffers the data during the computing processes for performing this co-ordinate conversion. The polygon data converted to two-dimensional co-ordinates is input to a rendering process circuit 6. This rendering process circuit 6 is connected to a Z buffer memory and a texture memory 7. The polygon data has a depth in the Z axis direction, in other words, a magnitude in the depth direction of the two-dimensional plane, and in the case of opaque polygons, it is effective to display polygons having little depth in the Z axis direction.

Texture data is stored in the texture memory. The polygon data comprises a texture memory address for reading out texture to be attached to each respective polygon, from the texture memory.

Consequently, the rendering process circuit 6 creates effective polygons on the basis of the Z-direction depth data and texture memory address contained in the polygon data output by the view converting circuit 4, attaches texture data thereto, and writes the resulting image data to the video RAM 6.

The video RAM 6 is constituted by a pair of frame memories, each respectively having a one frame memory capacity. When one of the frame memories is in an image data writing state, the other frame memory assumes an image data read-out state.

The image data read out from the video RAM 6 is converted to an analogue video signal at the monitor 9 and the corresponding image is displayed on the monitor screen.

In the execution of a fighting game program controlled by the main CPU 2 in a game device having the composition described above, the present invention has a characteristic feature relating to the control of the display method for a character operated by a player joining in a game, in other words, a player making a sudden intrusion into the game.

Figure 2:
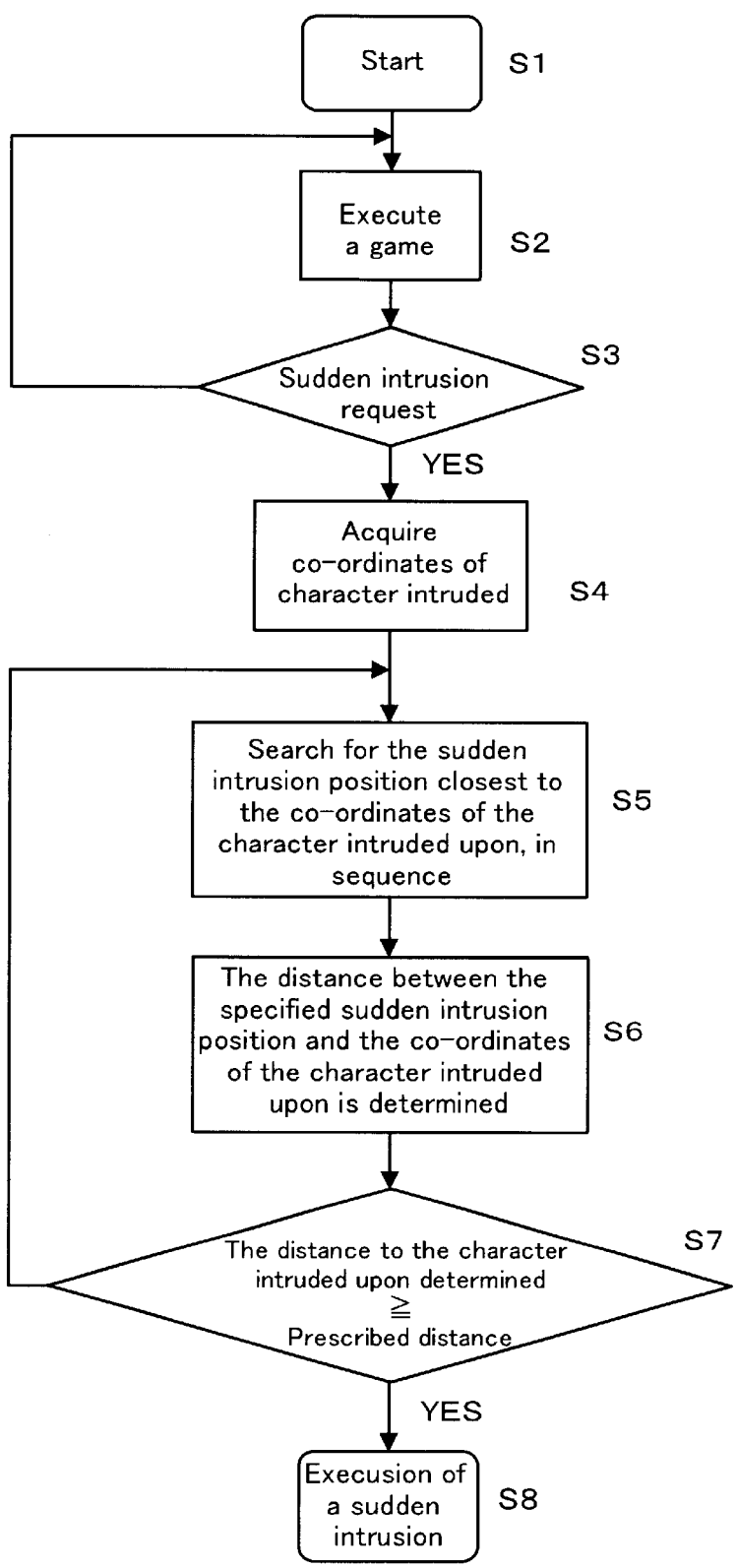
FIG. 2 is an operational flow diagram of intrusion processing according to the present invention as implemented by the game device according to FIG. 1.

FIG. 2 is an operational flow diagram of a game image display method relating to the present invention, as implemented in the game device illustrated in FIG. 1. The operational flow in FIG. 2 is executed in accordance with the fighting game program stored in the large-capacity memory 1.

Figures 3, 4:
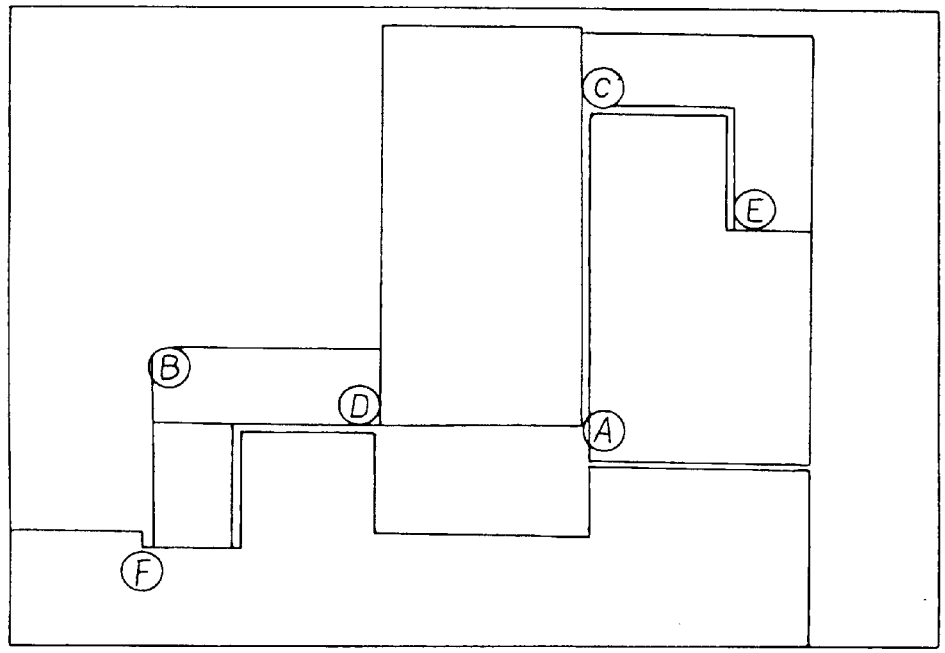
FIG. 3 is an example illustrating possible appearance positions for an intruder character in one game field.
FIG. 4 is a table showing the appearance positions illustrated in FIG. 3 and their corresponding co-ordinates, as stored in the main memory 3.

FIG. 3 is an image of a game field screen in a fighting game relating to the present invention. Specifically, FIG. 3 shows a plan view of the layout of one game field on which a fighting game is played out. The characters fighting on this game field are controlled in such a manner that they are displayed moving about on the screen.

In FIG. 3, symbols A–F respectively indicate possible appearance positions for an intruder character in a game field according to the present invention. These appearance positions A–F for the intruder character in FIG. 3 are also represented as table data, which is included as a portion of the fighting game program data.

In other words, the respective co-ordinate positions of the appearance positions A–F in the game field are contained in the fighting game program data in the form of a table, as illustrated in FIG. 4.

Under the control of the main CPU 2, this data is read out from the large-capacity memory 1, as the fighting game program is executed, and stored in the main memory 3. Returning to FIG. 2, a fighting game program starts to be executed (step S1), when the power supply is turned on to a prescribed game device, or in accordance with the program start settings, and the game is executed (step S2). As described above, the game can be executed according to a first game mode or a second game mode.

During the execution of the game, the main CPU 2 detects whether or not there is a sudden intrusion request (step S3). This sudden intrusion request is detected by the main CPU 2 when a player wishes to make a sudden entry into the game and inputs a specific instruction to the game device via input means, such as an input pad, or the like, (not illustrated in FIG. 1).

In FIG. 2, when the main CPU 2 determines that a sudden intrusion request has been made, it acquires the co-ordinates at which the character being intruded upon is displayed on the display screen of the monitor 9 (step S4).

Thereupon, as stated previously, the main CPU 2 reads in the table illustrated in FIG. 4, for example, from the main memory 3, and searches for the sudden intrusion position closest to the co-ordinates of the character being intruded upon, in sequence (step S5). Next, the distance between the specified sudden intrusion position and the co-ordinates of the character being intruded upon is determined (step S6).

It is then judged whether or not the distance to the character being intruded upon thus determined is greater than a prescribed distance (step S7).

Here, the step of judging whether or not the distance in the virtual space between the character being intruded upon and the sudden intrusion position is greater than a prescribed distance is carried out for the following reason.

Figure 6:
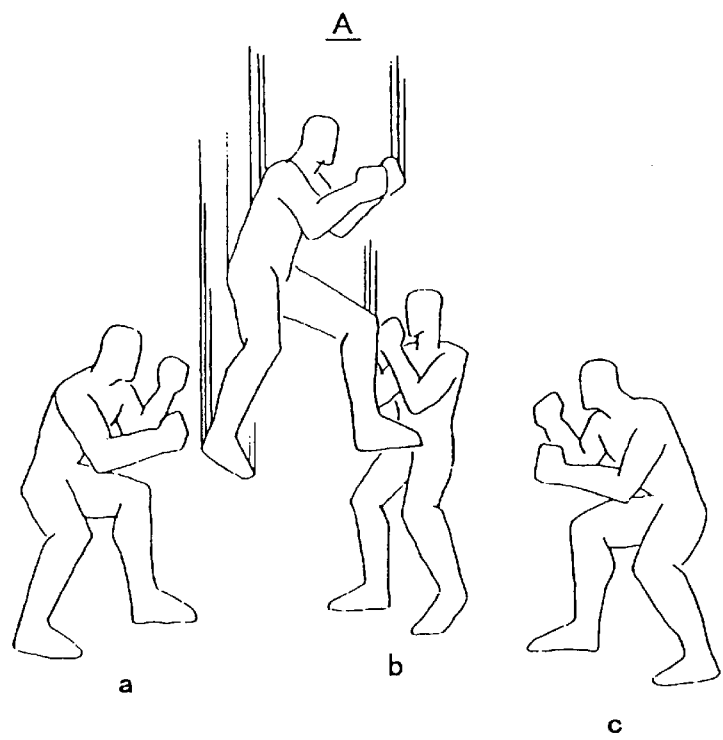
FIG. 6 is an image display example wherein an intruder character makes an appearance, according to a conventional method.

As described previously with reference to a conventional sudden intrusion display method, as illustrated in FIG. 6, in cases where the distance to the co-ordinates of the character being intruded upon is less than a prescribed distance, the intruder character will instantly receive an attack from the character being intruded upon, the moment that the intruder character makes its entry, and hence the sudden intrusion will prove extremely difficult for the player attempting to make a sudden entry into the game.

Consequently, in the execution of a sudden intrusion, it is made a condition that the distance to the character being intruded upon is greater than a prescribed distance (step S8).

Moreover, in step S5 in FIG. 2, it was described that the main CPU 2 searches for the sudden entry position closest to the co-ordinates of the character being intruded upon, from the sudden intrusion position list, in sequence, but if the intruder character is making an entrance at a position distant from the co-ordinates position of the character being intruded upon, then the position at which the intruder character appears is not necessarily limited to being a position within the field displayed on the monitor screen.

In this case, when the player attempts to make a sudden intrusion, he or she is required to move the character he or she is controlling up to a position where that character can fight with the character being intruded upon, and this significantly detracts from the players' enjoyment of the game.

However, if the player's character makes a sudden entrance at a position very close to the character being intruded upon, then as described above, this is disadvantageous to the player who is making the sudden entrance.

Figure 5:
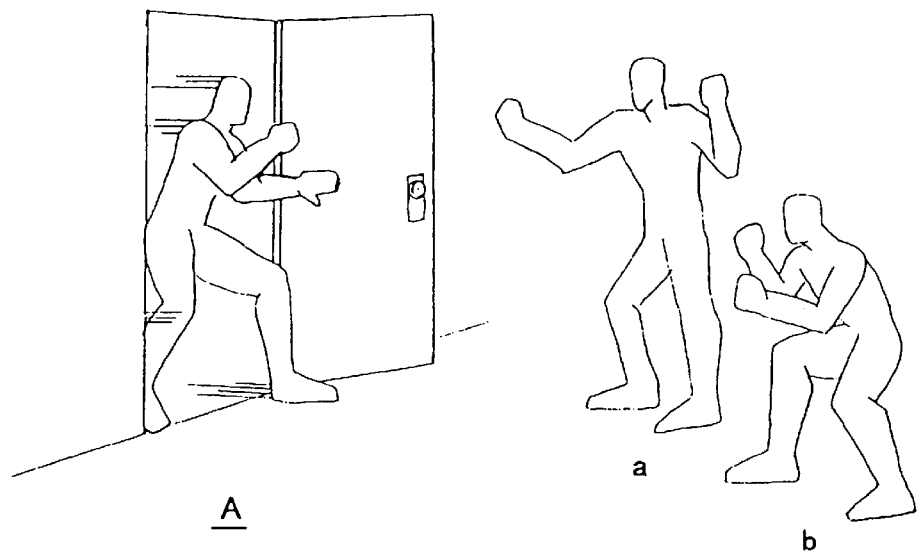
FIG. 5 is one example of a monitor screen wherein an intruder character is displayed making an appearance, according to the present invention.

A scene where a sudden intrusion is enacted by the display method according to the present invention is shown in FIG. 5. In FIG. 5, the position co-ordinates of a door located on a particular wall surface are listed as an appearance position, and the intruder character A is depicted making a sudden appearance from this door.

Fighting characters a, b are standing facing the door in the vicinity thereof. Consequently, it is possible to display the intruder character A appearing in a very natural manner from a door which has an essential practical purpose.

The description of the foregoing embodiment related to a case where a character is displayed making an appearance by a sudden entry on the screen in a fighting game. However, the present invention is not limited to a fighting game. It can also be applied to participatory games in general, in other words, games based on processing the actions of a plurality of characters operated respectively by a plurality of players. Specifically, it can be applied to processing in participatory games, whereby the number of characters increases during the game and characters are displayed appearing on the screen in successive fashion.

INDUSTRIAL APPLICABILITY

As described above with reference to the embodiment and the relevant drawings, it is possible to display an intruder character appearing from a prescribed appearance position in a natural manner. Moreover, since there is a prescribed distance between the character receiving the intrusion or the entry of the other character, and the character making the intrusion or entry into the game, it is possible to avoid situations where the player operating the character making the intrusion or entry is at an unfair disadvantage.

The scope of the present invention is not limited to the embodiment described above, and also covers the inventions described in the accompanying claims and items equivalent thereto.

What is claimed is:

1. A method for controlling the movements on a display screen of at least one character of a plurality of characters displayed on a display device, according to operations implemented by a player, and executing a game in association with the movements of other characters, comprising the steps of:

executing and controlling a game program;

storing co-ordinates of a plurality of specific locations in a scene developed according to the execution of said game program and displayed on said display screen;

acquiring a co-ordinate position of a character displayed on said display screen receiving an intrusion by another character, when an intrusion request for a character is detected; and displaying the character being controlled by said player as making an appearance as an intruding character from a specific location corresponding to a co-ordinate position having a particular relationship with respect to the co-ordinate position of said character receiving the intrusion, from amongst said stored plurality of specific locations, wherein the co-ordinate position of said specific location corresponding to a co-ordinate position having a particular relationship with respect to the co-ordinate position of said character receiving the intrusion is a co-ordinate position which is in the vicinity of the co-ordinating position of said character receiving the intrusion and separated by a prescribed distance or more from said character receiving the intrusion.

2. The method for executing a game according to claim 1, wherein said intruding character is a character which engages in combat with said character receiving the intrusion, the display of which is controlled in accordance with the operations implemented by the player.

3. The method for or executing a game according to claim 1, wherein said intruding character is a character which engages in combat with said character receiving the intrusion, the display of which is controlled in accordance with the operations implemented by the player.

4. A game device for controlling the movements on a display screen of at least one character of a plurality of characters displayed on a display device, according to operations implemented by a player, and executing a game in association with the movements of other characters, comprising:

control means for executing and controlling a game program; and a memory for storing co-ordinates of a plurality of specific locations in a scene developed according to the execution of said game program and displayed on said display screen, wherein a co-ordinate position of a character displayed on said display screen receiving an intrusion by another character is acquired, when an intrusion request is detected; and the character being controlled by said player is displayed as making an appearance as an intruding character from a specific location corresponding to a co-ordinate position having a particular relationship with respect to the co-ordinate position of said character receiving the intrusion, from amongst said stored plurality of specific locations, the co-ordinate position of said specific location corresponding to a co-ordinate position having a particular relationship with respect to the co-ordinate position of said character receiving the intrusion being a co-ordinate position which is in the vicinity of the co-ordinate position of said character receiving the intrusion and separated by a prescribed distance or more from said character receiving the intrusion.

5. The game device according to claim 4, wherein said intruding character is a character which engages in combat with said character receiving the entrance, the display of which is controlled in accordance with the operations implemented by the player.

6. The game device according to claim 4, wherein said intruding character is a character which engages in combat with said character receiving the intrusion, the display of which is controlled in accordance with the operations implemented by the player.

7. A storage medium used in a game device for storing a game program for controlling the movements on a display screen of at least one character of a plurality of characters displayed on a display device, according to operations implemented by a player, and executing a game in association with the movements of other characters, wherein said game program stores co-ordinates of a plurality of specific locations in a scene developed according to the execution of said game program and displayed on said display screen;

acquires a co-ordinate position of a character displayed on said display screen receiving an intrusion by another character, when an entrance request is detected; and displays the character being controlled by said player as making an appearance as an intruding character from a specific location corresponding to a co-ordinate position having a particular relationship with respect to the co-ordinate position of said character receiving the intrusion, from amongst said stored plurality of specific locations, the co-ordinate position of said specific location corresponding to a co-ordinate position having a particular relationship with respect to the co-ordinate position of said character receiving the intrusion being a co-ordinate position which is in the vicinity of the co-ordinate position of said character receiving the intrusion and separated by a prescribed distance or more from said character receiving the intrusion.

8. The storage medium for storing a game program according to claim 7, wherein said intruding character is a character which engages in combat with said character receiving the intrusion, the display of which is controlled in accordance with the operations implemented by the player.

9. The storage medium for storing a game program according to claim 7, wherein said intruding character is a character which engages in combat with said character receiving the intrusion, the display of which is controlled in accordance with the operations implemented by the player.

* * * * *